United States Patent [19]

Geke et al.

[11] Patent Number: 4,541,931

[45] Date of Patent: Sep. 17, 1985

[54] LIQUID NEUTRAL ONE PACKAGE COAGULATING AGENTS FOR LACQUERS AND COATING MATERIALS

[75] Inventors: Juergen Geke, Duesseldorf; Hans-Joerg Rehm, Hilden, both of Fed. Rep. of Germany

[73] Assignee: Henkel Kommanditgesellschaft auf Aktien, Duesseldorf, Fed. Rep. of Germany

[21] Appl. No.: 607,341

[22] Filed: May 4, 1984

[30] Foreign Application Priority Data

May 7, 1983 [DE] Fed. Rep. of Germany ....... 3316878

[51] Int. Cl.$^4$ ............................................... C02F 1/56
[52] U.S. Cl. .................................... 210/728; 210/735
[58] Field of Search ............... 210/728, 732, 735, 902, 210/903

[56] References Cited

U.S. PATENT DOCUMENTS

| | | | |
|---|---|---|---|
| 3,203,910 | 8/1965 | Wilson | 210/735 X |
| 3,252,900 | 5/1966 | Kelman et al. | 210/735 |
| 3,288,640 | 11/1966 | Flock | 210/735 X |
| 3,579,488 | 5/1971 | Jones et al. | 210/735 X |
| 3,951,792 | 4/1976 | Azorlosa et al. | 210/735 X |
| 4,055,404 | 10/1977 | Daimer | 55/85 |
| 4,089,831 | 5/1978 | Chambers | 210/732 X |
| 4,096,061 | 6/1978 | Brennan | 210/728 X |
| 4,164,612 | 8/1979 | Suzuki et al. | 526/62 |
| 4,401,574 | 8/1983 | Farrington et al. | 210/728 |

FOREIGN PATENT DOCUMENTS

| | | |
|---|---|---|
| 2749295 | 5/1978 | Fed. Rep. of Germany . |
| 1489064 | 4/1966 | France . |
| 1509042 | 4/1978 | United Kingdom . |
| 1512022 | 5/1978 | United Kingdom . |

OTHER PUBLICATIONS

Technical Bulletin (Molecular Weight Calibration Standards).

*Primary Examiner*—Thomas Wyse
*Attorney, Agent, or Firm*—Ernest G. Szoke; Henry E. Millson, Jr; Mark A. Greenfield

[57] ABSTRACT

A one package coagulating agent for lacquer and coating material contaminants in water and a method for its use, the agent comprising (a) at least one inorganic, water soluble, alkaline earth metal salt, and (b) at least one water soluble, cationically modified, polyethylene imine, the salt and imine being present in a mol ratio of about 50–1:1 respectively.

6 Claims, No Drawings

LIQUID NEUTRAL ONE PACKAGE COAGULATING AGENTS FOR LACQUERS AND COATING MATERIALS

BACKGROUND OF THE INVENTION

1. Field of the Invention

This invention relates to liquid, neutral one package coagulating agents for coagulating lacquers and coating compositions.

2. Statement of the Prior Art

In the application of lacquers, waxes or similar coating materials containing water insoluble organic substances, for example in the automotive industry, it is not possible to apply all of the materials to the parts to be coated. It is particularly in the lacquering of motor vehicles that there is an accumulation of overspray in the lacquer spray cubicles, which is removed from the spray cubicles by means of a water curtain and flushed into a settling tank. In order not to disturb the operation of the water carrying pipe, jet and sprinkler systems, (for example by tacky lacquer particles) and to remove from the circulating water the ingredients taken up, chemicals have to be added to the water to coagulate the substances in question. In this connection, the separation of the sprayed lacquer particles taken up by the water and their agglomeration to a dischargeable coagulate preferably should take place in one and the same operation.

Depending on the industrial installations used, a lacquer coagulant is employed whereby either the lacquer coagulate floats in the settling tank enabling it to be skimmed off the surface of the water, or the coagulate sediments and is subsequently scraped off the bottom of the tank by means of a scraper belt.

In order to obtain coagulation, i.e. separation of the lacquer particles and their agglomeration to form a dischargeable coagulate, alkaline powdered and alkaline liquid products and also powdered neutral products have hitherto been added to the circulating water. A liquid two step coagulating agent may also be introduced through an elaborate metering system.

Thus, British Patent Application No. 1,512,022 describes flocculating agents, i.e. agents which cause particles to combine with one another under the effect of intermolecular, bridge forming macromolecules. Agents such as these are made up of inorganic metal salts acting as clarifying agents, such as ferrous chloride or aluminium sulfate, and organic cationic polymers, such as polyvinyl pyridine or polyamines in aqueous solution.

Water soluble cationic polymers which are obtainable in powder form and used as flocculating agents are described in German Patent Application No. 27 49 295. To improve flocculation behavior and, at the same time, to reduce the molecular weight of the polymer and hence to increase the solubility of the product, powdered water soluble inorganic salts are added. This results in the formation of a water soluble cationic polymer in the form of a solid mass.

However, the use of powdered coagulating agents of this type is attended by the serious disadvantage that they have first to be suspended in water for the coagulation process. This presents problems in addition to the metering of the agents. Moreover, the stirring operation which is required for thorough suspension of the powder form products has an adverse effect upon the desirable flocculation process essential to the invention. This in turn adversely affects the mode of action and necessitates the use of relatively high concentrations of coagulating agent. In addition, the use of coagulating agents in powder form is not possible any place where dust emission has to be strictly avoided.

The pH values of the aqueous solutions of the coagulating agents previously normally used are generally in the alkaline range. This ensures that separation of the individual lacquer or wax particles is generally adequate and the operation of the water carrying systems is not disturbed. However, this necessitates careful monitoring of the alkalinity of the baths and, in some cases, neutralization of the coagulate waters before discharge into the drainage system.

Due to the alkalinity or the increased pH value of the baths, the resins or binders present in the lacquers can be hydrolyzed. Troublesome foaming is the result and relatively expensive antifoam agents additionally have to be introduced.

DESCRIPTION OF THE INVENTION

The present invention seeks to overcome the disadvantages of the prior art by turning away in its mode of action from the formation of voluminous adsorbents, flocks, or the like, which is characteristic of conventional products. Instead, the invention brings about neutralization of the electrical boundary charges of the lacquer particles and subsequent agglomeration of the microparticles without the formation of any intermediate products.

This different physiochemical behavior is crucially important so far as metering is concerned. Unless powder products are to be added through a powder metering unit or manually, they have to be suspended before use and then added to the circulating water. By contrast, the liquid, neutral, one package products according to the present invention provide for problem free, continuous, automatic control of metering. In addition, batch and/or manual metering is also possible.

Moreover, particularly economical use is possible by virtue of the very low concentrations of active substance which are required for obtaining favorable coagulation behavior.

The liquid neutral product used in accordance with the invention is suitable for the coagulation both of any standard lacquers and of coating materials, such as waxes and undersealing compounds. The coagulate obtained shows complete separation, but is not hard, does not adhere to any parts of the installation used and may readily be discharged. Further, white water-sprinkled spray walls are not discolored.

The present invention utilizes aqueous one package coagulating compositions containing as active ingredients alkaline earth metal salts and polyalkylene imines, the compositions having a pH range of about 6 to 9.

The alkaline earth metal salts are inorganic and must be water soluble to be included in this invention. Calcium and magnesium salts are preferred, and the salts can be employed individually or in any combination.

Calcium salts that are useful include the bromide, chloride, iodide, hypophosphite, and nitrate, the chloride and nitrate being preferred.

Magnesium salts that are useful include the bromide, chloride, iodide, nitrate, sulfate, and thiosulphate, the chloride, nitrate and sulfate being preferred.

The polyalkylene imines must be water soluble to be useful in this invention and are preferably polyethylene imines which have been modified cationically either by protonation or by alkylation (preferably methylation) of the nitrogen, or which are converted into the corresponding ammonium salts. The degree of modification differs and depends upon the neutral starting polymer, upon the corresponding acid for protonation or upon the corresponding alkylating agent, Tertiary nitrogen atoms are not completely protonated or alkylated. It is possible to use protonated and/or methylated polyethylene imines which have a weight-average molecular weight of about from $5 \times 10^4$ to $5 \times 10^7$ and preferably about from $7.5 \times 10^4$ to $5 \times 10^6$.

Dissolved in water, the mixtures of the above mentioned electrolytes and the water soluble modified polyethylene imines give homogeneous solutions which generally bring about the flotation of the coagulate. After the lacquer residues have been skimmed off, the circulating water may be reused. In smaller installations, the lacquer is discharged by hand once or several times a week, depending on the amount which has accumulated. Larger installations are equipped with scraper chains which remove the lacquer sludge from the bath surfaces either continuously or at intervals.

The essential components (inorganic salts and polyethylene imines) may be present in a different ratio in the solutions used for coagulating lacquers and for coating materials. The respective molar ratio between the essential components is in the range from about 50-1:1 and preferably in the range from about 15-5:1.

Water soluble biocides, such as at least one of formaldehyde, isothiazolines and derivatives thereof, and pyridine N-oxide and derivatives thereof, may also be added to the formulations of the coagulating agents according to the invention.

The agents used in accordance with the invention are produced either by preparing liquid aqueous concentrates of the electrolytes with subsequent addition of polyethylene imines and auxiliary substances or by mixing the corresponding active substances in the above molar ratios. These mixtures may then be brought into the required liquid concentrate form in advance or at the point of use simply by dissolution in the appropriate quantity of water and addition to the circulating water in that form. The addition is best made at a point of high turbulence of the circulating water with the pump on in order to guarantee rapid distribution. Completely homogeneous solutions are obtained in this way, their pH value being adjustable as required to pH 6-9 in any known manner.

The coagulating agents used in accordance with the invention are metered either continuously by means of suitable metering pumps or at intervals, for example manually once a day. In this connection, the coagulating agents used in accordance with the invention are added to the coagulating solution in such a quantity that the content of salts of calcium and/or magnesium amounts to between 1 and 50 ppm per hour of operating time and the content of modified polyethylene imines to between 0.1 and 20 ppm per hour of operating time. This corresponds to between 1 and 50 g per m$^3$ of circulating liquid per hour of operating time of the installation and to between 0.1 and 20 g per m$^3$ of circulating liquid per hour of operating time, respectively.

The following are formulations of the neutral one package coagulating agents according to the invention, the figures representing percentages by weight based on the total weight of the composition.

EXAMPLES 1.
   35% of calcium nitrate
   7% of protonated polyethylene imine
   balance water 2.
   30% of magnesium nitrate
   5% of magnesium sulfate
   5% of methylated polyethylene imine
   balance water 3.
   20% of calcium nitrate
   10% of magnesium nitrate
   5% of protonated polyethylene imine
   balance water 4.
   60% of calcium nitrate
   10% of magnesium chloride
   4% of methylated polyethylene imine
   balance water 5.
   35% of calcium chloride
   5% of magnesium chloride
   4% of methylated polyethylene imine
   balance water

THEORETICAL WORKING EXAMPLE

After a workpiece such as an automotive body part has been sprayed with a lacquer, paint, or other coating in a spray cubicle, the accumulation of overspray is removed from the cubicle by a water curtain and flushed into a settling tank. To permit recycling of the water and to prevent environmental contamination, it is very desirable to remove the lacquer, paint, or other coating contaminants from the water. This is accomplished by a one package method using the inventive liquid concentrate compositions, by adding such compositions to the contaminated water in metered amounts as described herein. As a result of the addition, the contaminants are coagulated and easily removed, and the purified water either is discarded or is recycled without the danger of the contaminants blocking the water curtain generating apparatus. Because the inventive compositions are in liquid form, they are available to coagulate the contaminants immediately they are added to the waste water. Additionally, the amount of the inventive compositions being added is easily varied to compensate for variable amounts and/or types of contaminants, thus assuring purification of the water to an acceptable level.

We claim:

1. A one package method of coagulating lacquers and coating material contaminants in water comprising adding a coagulation-effective amount of a coagulating agent comprising an aqueous solution with a pH of about 6 to 9 of (a) at least one inorganic, water soluble, alkaline earth metal salt and (b) at least one water soluble, cationically modified, polyethylene imine or its ammonium salt, said alkaline earth metal salt and imine being present in a mol ratio of about 50-1:1, respectively; wherein the ingredients of said coagulating agent are added to the water to be treated so that said at least one alkaline earth metal salt is added in an amount of about 1 to 50 ppm per operating hour of the coagulating method and so that said at least one imine is added in an amount of about 0.1 to 20 ppm per operating hour of the coagulating method.

2. The method of claim 1 wherein said at least one alkaline earth metal salt is a calcium salt or a magnesium salt and said at least one imine has been modified by protonation or by methylation.

3. The method of claim 2 wherein said alkaline earth metal salt is at least one of calcium chloride, calcium nitrate, magnesium chloride, magnesium nitrate or magnesium sulfate.

4. The method of claim 1 wherein said mol ratio is about 15–5:1.

5. The method of claim 2 wherein said imine has a weight-average molecular weight of about from $5 \times 10^4$ to $5 \times 10^7$.

6. The method of claim 2 wherein said imine has a weight-average molecular weight of about from $7.5 \times 10^4$ to $5 \times 10^6$.

* * * * *